(12) United States Patent
Ma et al.

(10) Patent No.: US 12,436,991 B2
(45) Date of Patent: Oct. 7, 2025

(54) INFORMATION DISPLAY METHOD AND APPARATUS, COMPUTER DEVICE, AND STORAGE MEDIUM

(71) Applicant: Beijing Bytedance Network Technology Co., Ltd., Beijing (CN)

(72) Inventors: Huarong Ma, Beijing (CN); Yanli Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/565,491

(22) PCT Filed: Aug. 16, 2022

(86) PCT No.: PCT/CN2022/112667
§ 371 (c)(1),
(2) Date: Nov. 29, 2023

(87) PCT Pub. No.: WO2023/045623
PCT Pub. Date: Mar. 30, 2023

(65) Prior Publication Data
US 2024/0256593 A1    Aug. 1, 2024

(30) Foreign Application Priority Data
Sep. 22, 2021 (CN) .......................... 202111108138.X

(51) Int. Cl.
*G06F 16/00* (2019.01)
*G06F 16/34* (2019.01)
(Continued)

(52) U.S. Cl.
CPC .......... *G06F 16/438* (2019.01); *G06F 16/345* (2019.01); *G06F 16/435* (2019.01); *G06F 16/9532* (2019.01); *G06F 16/9574* (2019.01)

(58) Field of Classification Search
CPC .... G06F 16/438; G06F 16/435; G06F 16/345; G06F 16/9532; G06F 16/9574
(Continued)

(56) References Cited

U.S. PATENT DOCUMENTS

| | | | | |
|---|---|---|---|---|
| 2012/0191577 A1* | 7/2012 | Gonsalves | ......... | G06Q 30/0643 705/27.2 |
| 2015/0347532 A1* | 12/2015 | Shaw | ................... | G06F 16/9535 707/722 |

(Continued)

FOREIGN PATENT DOCUMENTS

| | | | |
|---|---|---|---|
| CN | 102542001 A | 7/2012 | |
| CN | 103500163 A | 1/2014 | |

(Continued)

OTHER PUBLICATIONS

Wang Xiaojing, "Research on Interactive Systems Design of Enterprise Live Broadcast Based on Activity Theory", Chinese Excellent Master's Thesis Full Text Database, Social Sciences II, Issue 5, Nov. 1, 2015, 132 pages, with English Abstract.
(Continued)

*Primary Examiner* — Chelcie L Daye
(74) *Attorney, Agent, or Firm* — Astute IP Law Group

(57) ABSTRACT

An information display method and apparatus, a computer device and a storage medium are provided. The method includes: receiving search information; in response to the existence of a target event matching the search information, displaying an event context of the target event in a first area of a search result page. The event context includes a plurality of event nodes, a core content of each event node is presented through first multimedia information and first key information corresponding to the event node, the presentation form of the first key information is different from the presentation form of the first multimedia information, and
(Continued)

the first key information is a summary of the first multimedia information.

17 Claims, 8 Drawing Sheets

(51) Int. Cl.
    *G06F 16/435*     (2019.01)
    *G06F 16/438*     (2019.01)
    *G06F 16/9532*     (2019.01)
    *G06F 16/957*     (2019.01)

(58) Field of Classification Search
    USPC .......................................................... 707/722
    See application file for complete search history.

(56) References Cited

U.S. PATENT DOCUMENTS

| | | |
|---|---|---|
| 2017/0083590 A1 | 3/2017 | Jagarlamudi et al. |
| 2019/0042551 A1* | 2/2019 | Hwang ................ G06F 40/289 |
| 2020/0175087 A1 | 6/2020 | Sun |
| 2021/0248669 A1 | 8/2021 | Wade et al. |
| 2022/0350856 A1* | 11/2022 | Yang .................. G06F 16/9574 |

FOREIGN PATENT DOCUMENTS

| | | |
|---|---|---|
| CN | 104063521 A | 9/2014 |
| CN | 104102713 A | 10/2014 |
| CN | 104615783 A | 5/2015 |
| CN | 107229645 A | 10/2017 |
| CN | 108322806 A | 7/2018 |
| CN | 111460289 A | 7/2020 |
| CN | 111611492 A | 9/2020 |
| CN | 112084268 A | 12/2020 |
| CN | 113157970 A | 7/2021 |
| CN | 113204690 A | 8/2021 |
| CN | 113220774 A | 8/2021 |
| CN | 113254779 A | 8/2021 |
| CN | 113255349 A | 8/2021 |
| CN | 113836448 A | 12/2021 |

OTHER PUBLICATIONS

Wang et al., "Recommending high-utility search engine queries via a query-recommending model", Neurocomputing, vol. 167, Nov. 1, 2015, 14 pages.

* cited by examiner

INFORMATION DISPLAY METHOD AND APPARATUS, COMPUTER DEVICE, AND STORAGE MEDIUM

This is a national stage application filed under 37 U.S.C. 371 based on International Patent Application No. PCT/CN2022/112667, filed Aug. 16, 2022, which claims the priority of Chinese patent application No. 202111108138.X, entitled "INFORMATION DISPLAY METHOD AND APPARATUS, COMPUTER DEVICE AND STORAGE MEDIUM", filed with China National Intellectual Property Administration on Sep. 22, 2021, the disclosures of which are incorporated herein by reference in their entireties.

TECHNICAL FIELD

The present disclosure relates to the technical field of information processing, in particular to an information display method and apparatus, a computer device and a storage medium.

BACKGROUND

With the development of Internet technology, an increasing number of users are searching for information through the Internet.

Typically, when the user search for hot information, the multimedia content related to the hot information searched by the user is displayed in the search result in the order of relevance. Because of the large number of multimedia contents displayed, the user is unable to quickly acquire the multimedia content of interest, resulting in low information acquisition efficiency.

SUMMARY

Embodiments of the present disclosure provide at least an information display method and apparatus, a computer device and a storage medium.

In a first aspect, embodiments of the present disclosure provide an information display method, which includes:
  receiving search information; and
  in response to the existence of a target event matching the search information, displaying an event context of the target event in a first area of a search result page;
  the event context including a plurality of event nodes, a core content of each event node is presented through first multimedia information and first key information corresponding to the event node, the presentation form of the first key information is different from the presentation form of the first multimedia information, and the first key information is a summary of the first multimedia information.

In an optional embodiment, displaying an event context of the target event in a first area of a search result page includes:
  displaying the plurality of event nodes of the target event in the form of a timeline in the first area of the search result page, the time node on the timeline being in one-to-one correspondence with the event node, at each time node of the timeline, first multimedia information for describing the progress of the target event at the time node and first key information corresponding to the first multimedia information being displayed; or,
  displaying first multimedia information corresponding to each event node and first key information corresponding to the first multimedia information in the form of a card in the first area of the search result page.

In an optional embodiment, the method further includes:
  in response to a trigger operation for the first key information, displaying a multimedia information aggregation page, the multimedia information aggregation page at least including text information and video information related to the first key information, where a target content matching the first key information is highlighted in the text information, the video information includes a feature identifier and a video content, and the feature identifier is used for directly jumping to a time node corresponding to the first key information to play the video content after being triggered.

In an optional embodiment, the method further includes:
  displaying second multimedia information released within a preset time period in the form of a card in a second area of the search result page, the second multimedia information being related to at least one target entity, and the target entity being an entity object related to the target event; and
  displaying second key information corresponding to the second multimedia information at an associated position of the second multimedia information, the second key information being a summary of the second multimedia information.

In an optional embodiment, the method further includes:
  displaying a search suggestion of a sub-event in each dimension under the target event in a third area of the search result page, in case that the sub-event conforms to a preset attribute feature, a feature tag matching the preset attribute feature being displayed at a corresponding position of an event title of the sub-event.

In an optional embodiment, the method further includes:
  displaying comment information for the target event in a fourth area of the search result page, the comment information including comment author information, comment content information and a source identifier of the comment information; and
  in response to a trigger operation for the comment information, displaying original multimedia information where the comment information is located.

In an optional embodiment, the method further includes:
  displaying a plurality of search recommendation information associated with the target event in a fifth area of the search result page, wherein the search recommendation information is an entity object related to the target event, and/or the search recommendation information is associated with an event type of the target event.

In a second aspect, embodiments of the present disclosure provide an information display apparatus, which includes:
  a receiving module configured to receive search information; and
  a first display module configured to, in response to the existence of a target event matching the search information, display an event context of the target event in a first area of a search result page;
  the event context including a plurality of event nodes, a core content of each event node is presented through first multimedia information and first key information corresponding to the event node, the presentation form of the first key information being different from the presentation form of the first multimedia information, and the first key information being a summary of the first multimedia information.

In a third aspect, embodiments of the present disclosure provide a computer device, which includes a processor, a memory and a bus. when the computer device runs, the processor communicates with the memory through the bus; and when the machine-readable instructions are executed by the processor, the steps in the first aspect described above, or in any of the possible embodiments of the first aspect are executed.

In a fourth aspect, embodiments of the present disclosure further provide a computer-readable storage medium, a computer program is stored on the computer-readable storage medium, and when the computer program is executed by a processor, the steps in the first aspect described above, or in any of the possible embodiments of the first aspect are executed.

According to the embodiments of the present disclosure, the event context of the target event is displayed in the search result page, and the core content of each event node is displayed through the first multimedia information and the first key information corresponding to the event node, so that a summary of the event node can be quickly obtained according to the first key information summarized from the first multimedia information. Moreover, the different presentation forms of the first key information and the first multimedia information can lead to varying degrees of user attention for each. This further enables the rapid acquisition of a summary of the event node, thus meeting the users' need for rapid consumption of the event and improving the efficiency of information reading.

Embodiments of the present disclosure may also display a multimedia information aggregation page in response to a trigger operation for the first key information, thereby displaying detailed information of the event node to the user through text information and video information when the user has a need for in-depth information about the details of the event node, and thereby satisfy the user's need for in-depth consumption of the event.

In order to make the above objects, features and advantages of the present disclosure more evident and comprehensible, the following detailed description is provided, illustrating exemplary embodiments and accompanied by the drawings.

BRIEF DESCRIPTION OF THE DRAWINGS

To more clearly illustrate the embodiments of the present disclosure, the drawings required to be used for the embodiments are briefly described in the following. The drawings herein are incorporated into and form a part of the specification, illustrate embodiments consistent with the present disclosure, and are used in conjunction with the specification to explain the principles of the present disclosure. It should be understood that are only some embodiments of the present disclosure, and therefore should not be regarded as limiting the scope. For those skilled in the art, other drawings can be obtained based on these drawings without any inventive work.

DETAILED DESCRIPTION

Figure 1:
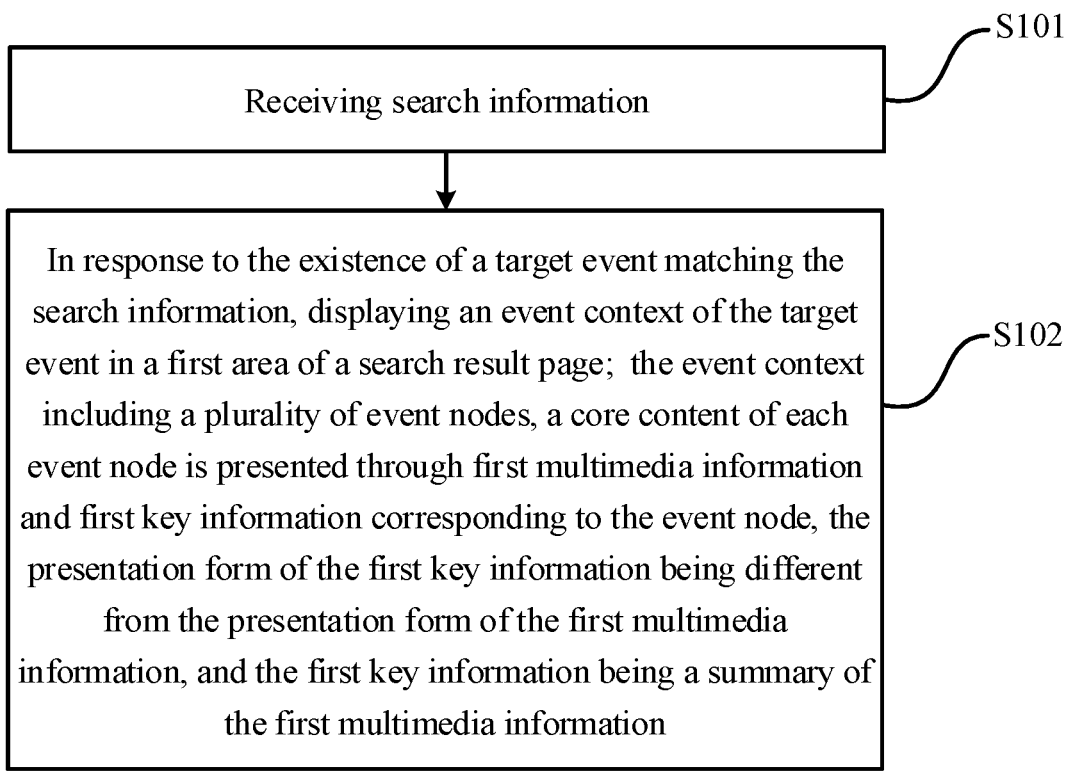
FIG. 1 is a flowchart of an information display method provided by an embodiment of the present disclosure.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all of the embodiments of the present disclosure. The components in the embodiments of the present disclosure generally described and illustrated in the drawings herein may be arranged and designed in various different configurations. Therefore, the following detailed description of the embodiments of the present disclosure provided in the accompanying drawings is not intended to limit the scope of the claimed disclosure, but merely represents selected embodiments of the present disclosure. Based on the described embodiments herein, those skilled in the art can obtain other embodiment(s), without any inventive work, which should be within the scope of the present disclosure.

When the user search for hot information, the multimedia content related to the hot information searched by the user is displayed in the search result in the order of relevance. Because of the large number of multimedia contents displayed, the user is unable to quickly acquire the multimedia content of interest, resulting in low information acquisition efficiency.

In view of this, an embodiment of the present disclosure provides an information display method. The method includes: receiving search information; and in response to the existence of a target event matching the search information, displaying an event context of the target event in a first area of a search result page; the event context including a plurality of event nodes, a core content of each event node is presented through first multimedia information and first key information corresponding to the event node, the presentation form of the first key information is different from the presentation form of the first multimedia information, and the first key information is a summary of the first multimedia information. According to the embodiment of the present disclosure, the event context of the target event is displayed in the search result page, and the core content of each event node is displayed through the first multimedia information and the first key information corresponding to the event node, so that a summary of the event node can be quickly obtained according to the first key information summarized from the first multimedia information. Moreover, the different presentation forms of the first key information and the first multimedia information can lead to varying degrees of user attention for each. This further enables the rapid acquisition of a summary of the event nodes, thus meeting the users' need for rapid consumption of the event and improving the efficiency of information reading.

The defects identified in the above solutions are the results of the inventors' practice and careful study. Therefore, the discovery process of the above problems and the solutions proposed in the present disclosure should all be considered as the contributions made by the inventors in the present disclosure process.

It should be noted that similar reference numerals and letters indicate similar items in the following accompanying drawings, so once an item is defined in one accompanying drawing, it will not be further defined and explained in subsequent accompanying drawings.

To facilitate the understanding of the embodiments, firstly, an information display method disclosed in an embodiment of the present disclosure is introduced in detail. The executive subject of the information display method provided in this embodiment of the present disclosure is generally a computer device with certain computing power, which includes, for example, a terminal device or a server or other processing devices. In some possible embodiments, the information presentation method can be realized by a processor invoking computer-readable instructions stored in a memory.

Next, the information display method provided by the embodiment of the present disclosure will be explained by taking a terminal device as the executive subject.

Referring to FIG. 1 which is a flowchart of an information display method provided by an embodiment of the present disclosure, the method includes S101-S102.

S101, receiving search information.

In the embodiment of the present disclosure, the search information may be a search information entered on a search page, and may also be a user-triggered action in response to a certain search information target.

S102, in response to the existence of a target event matching the search information, displaying an event context of the target event in a first area of a search result page; the event context including a plurality of event nodes, a core content of each event node is presented through first multimedia information and first key information corresponding to the event node, the presentation form of the first key information being different from the presentation form of the first multimedia information, and the first key information being a summary of the first multimedia information.

To enable the user to quickly access a target event matching the search information, the first area of the search result page can be located at the top of the search result page, and in case that there is a target event matching the search information, the event context of the target event can be displayed in the first area.

Specifically, the first multimedia information and the first key information corresponding to each event node can be displayed. The first multimedia information and the first key information may be information describing the core content of the event node. By extracting key information from the first multimedia information, summarized information can be obtained, that is, the first key information. The first key information can be information such as a tag a keyword, and the like.

The presentation form of the first key information is different from the presentation form of the first multimedia information. When both the first multimedia information and the first key information are in text form, the presentation form such as font size and character style can be different for the first key information and the first multimedia information. The different presentation forms of the first key information and the first multimedia information can lead to varying degrees of user attention for each. For example, highlighting the first key information can quickly grab the users' attention towards it, and allow them to quickly grasp the core content of each event node based on the first key information, thus improving the efficiency of information reading.

In an embodiment, a plurality of event nodes of the target event can be displayed in the form of a timeline in the first area of the search result page, the time node on the timeline are in one-to-one correspondence with the event node, and at each time node of the timeline, first multimedia information for describing the progress of the target event at the time node and first key information corresponding to the first multimedia information are displayed.

The display direction of the timeline can be vertical or horizontal. The time node on the timeline can be the release time of the core content in the target event, and can be arranged in order of release time. All the time nodes on the timeline can be displayed in the first area. In case that there are too many time nodes or the display range of the first area is limited, the time nodes can be partially displayed, specifically, a first preset number of time nodes can be displayed in the order of release time. At each time node of the timeline, in addition to displaying the first multimedia information and the first key information corresponding to the first multimedia information, corresponding time information can also be displayed.

Figure 2:
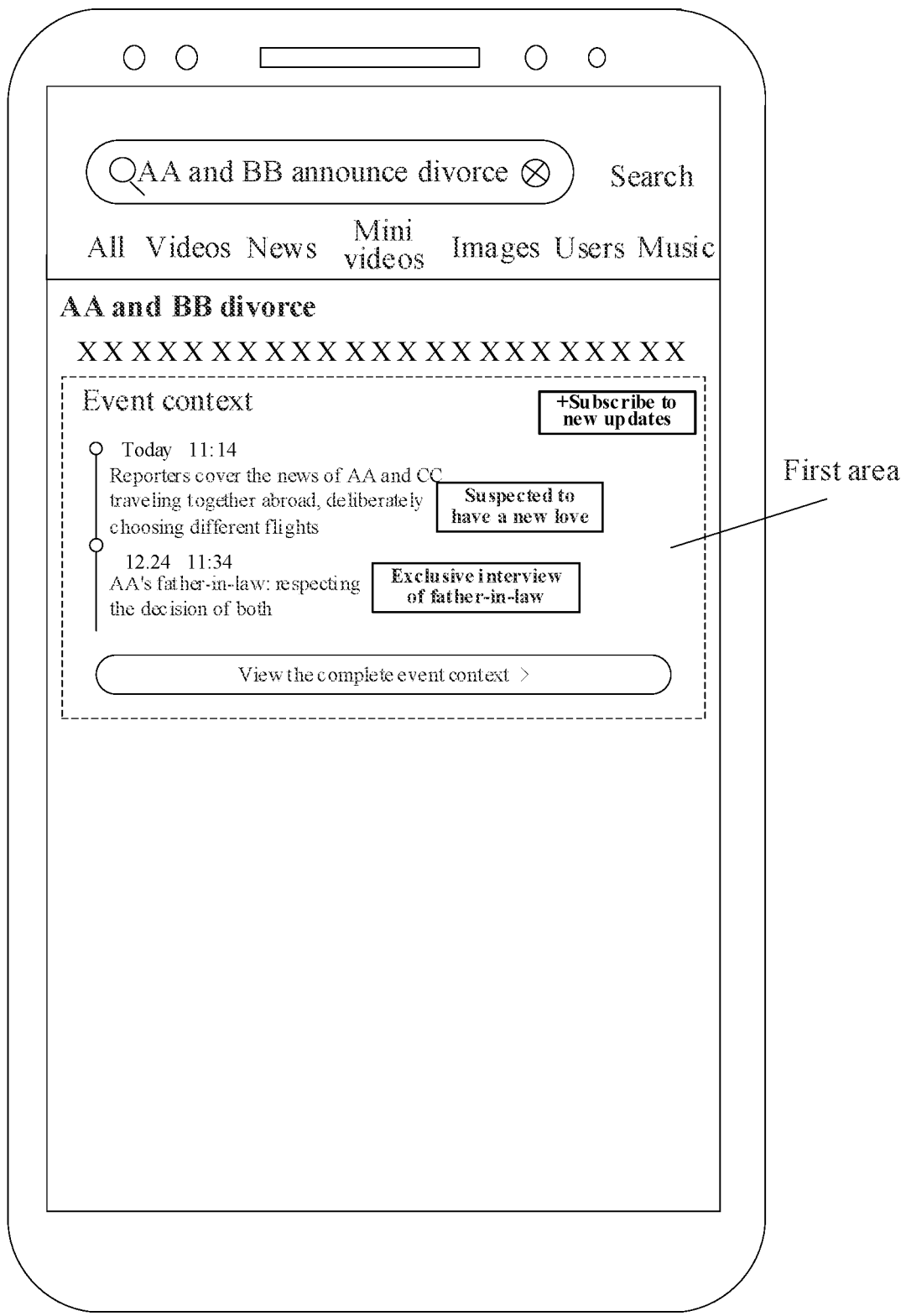
FIG. 2 is schematic diagram of a first search result page provided by an embodiment of the present disclosure.

As illustrated in FIG. 2, detailed information matching the search information ("AA and BB announce divorce") can be displayed at the top of the search result page. Below the detailed information, the first area is arranged to display a vertical timeline. On this vertical timeline, two time nodes are displayed from top to bottom in reverse chronological order of the release time of the core content. At each time node, first multimedia content and the first key information are displayed. For example, at the first time node, there is the first multimedia content "Reporters cover the news of AA and CC traveling together abroad, deliberately choosing different flights" and the first key information "Suspected to have a new love". Corresponding release time is also displayed at each time node. FIG. 2 only illustrates some of the time nodes, and below the second time node there is a trigger button labeled "View the complete event context". By clicking this button, all the time nodes on the vertical timeline and the corresponding event nodes for each time node can be displayed.

By reading the first multimedia information of each event node and the first key information corresponding to the first multimedia information according to the sequence of the time nodes, the progress of the target event can be quickly learned.

A subscription button can also be displayed in the first display area. When the user wants to continuously acquire progress of the target event, the subscribe button can be triggered to continuously update the event node of the event context which can be automatically displayed.

In an embodiment, first multimedia information corresponding to each event node and first key information corresponding to the first multimedia information can also be displayed in the form of a card in the first area of the search result page.

A second preset number of event nodes can be displayed in the first area, each event node can correspond to one card, the corresponding card can be an image related to the core content of the event node, and the cards of different event nodes can be the same or different. The first multimedia information corresponding to the event node and the first key information corresponding to the first multimedia information can also be displayed at corresponding positions of each card.

Figure 3:
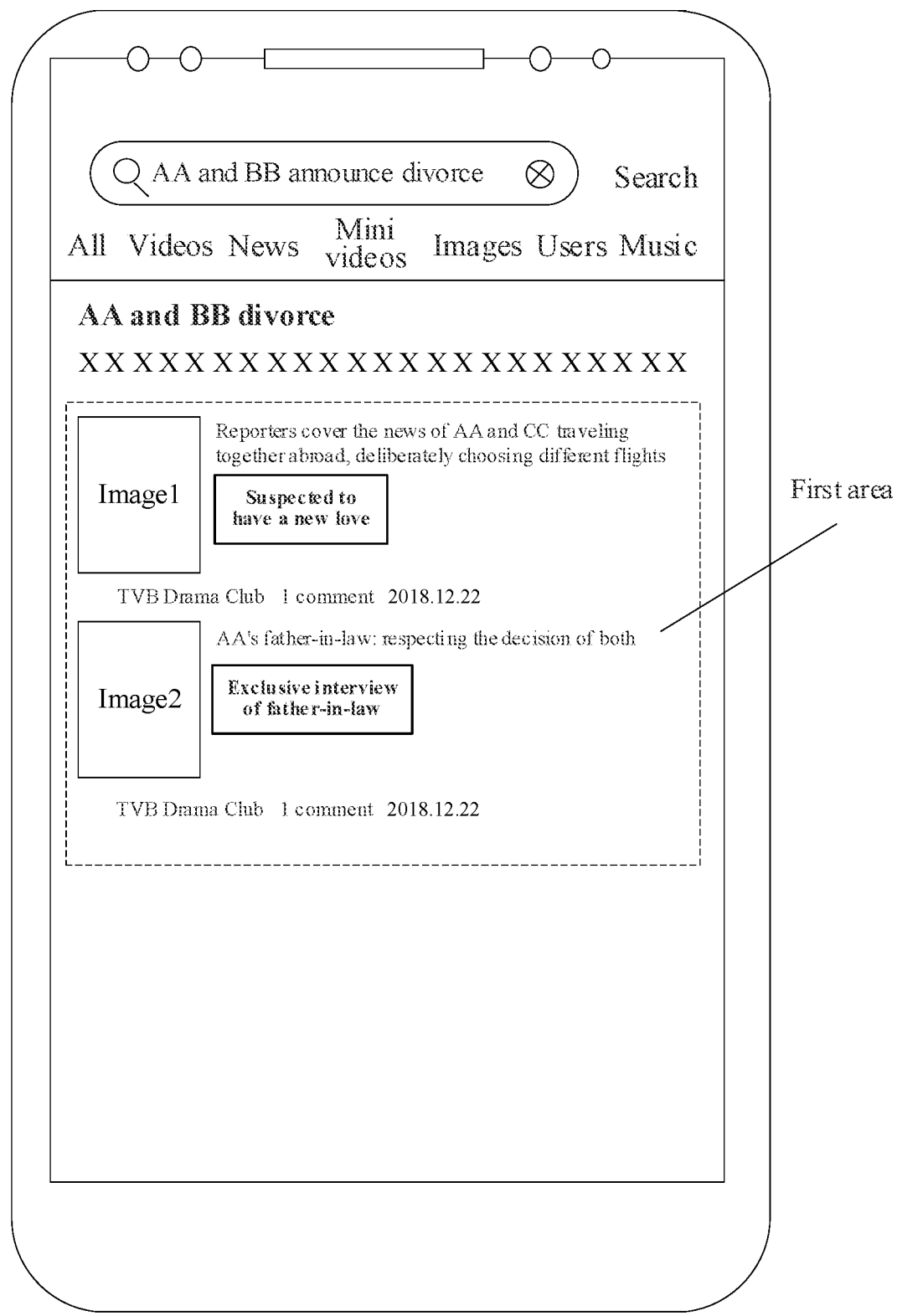
FIG. 3 is a schematic diagram of a second search result page provided by an embodiment of the present disclosure.

As illustrated in FIG. 3, two cards are displayed in the first area. The first multimedia information (e.g., "Reporters cover the news of AA and CC traveling together abroad, deliberately choosing different flights") and the first key information (e.g., "Suspected to have a new love") corresponding to the first multimedia information are displayed to the right of each card. Below each card, information such as the source, the number of comments, and the release time can also be displayed.

In order to meet users' reading needs for detailed information of the first key information, the detailed information of the first key information can also be displayed. In an embodiment, in response to a trigger operation for the first key information, a multimedia information aggregation page can be displayed, and the multimedia information aggregation page at least includes text information and video information related to the first key information, a target content matching the first key information is highlighted in the text information, the video information includes a feature identifier and video content, and the feature identifier is used for directly jumping to a time node corresponding to the first key information to play the video content after being triggered.

The detailed information corresponding to the first key information may at least include text information and video information related to the first key information, the text information may include target content described around the first key information. To enhance user engagement with the target content, the target content can be highlighted. The feature identifier in the video information is used for indicating playable information within the video content. After triggering the feature identifier, the video content can be played directly by jumping to the time node corresponding to the first key information.

Further, in order to enable the user to obtain more information related to the target event, in an embodiment, second multimedia information released within a preset time period can be displayed in the form of the card in a second area of the search result page, the second multimedia information is related to at least one target entity, and the target entity is an entity object related to the target event; and second key information corresponding to the second multimedia information is displayed at an associated position of the second multimedia information, and the second key information is a summary of the second multimedia information. The preset time period can be a time period close to the current time.

The second area may be located below the first area. When users want to obtain more information related to the target event, they can continue reading the second multimedia information and the second key information in the second area below the first area. The target entity may be the main object described in the target event, such as a character, a book, a TV show, etc. The second multimedia information and the second key information may be the description of the content related to the target entity, such as the introduction or encyclopedic information of the target entity. Displaying the second multimedia information in the form of the card can enrich the display form of information and increase user attention to the second multimedia information.

The associated position of the second multimedia information can be the top position of the second multimedia information, so that the user can quickly obtain the second key information, thereby quickly obtaining the summary of the second multimedia information. Further, in order to quickly capture the users' attention to the second key information, the second key information can be highlighted.

Figure 4:
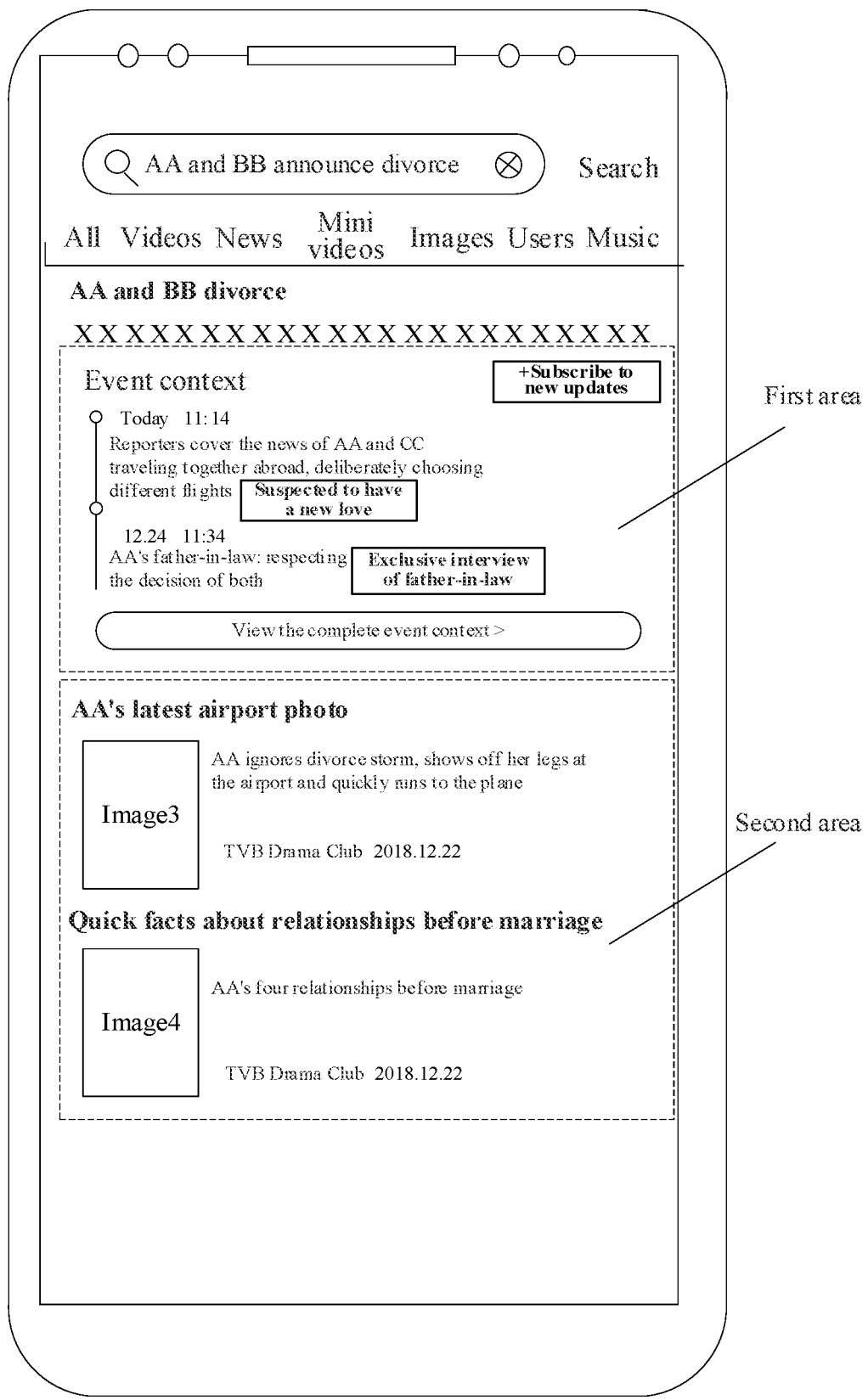
FIG. 4 is a schematic diagram of a third search result page provided by an embodiment of the present disclosure.

As illustrated in FIG. 4, a plurality of event nodes of the target event are displayed in the first area in the form of a timeline, the second area is located below the first area, and two second multimedia information and second key information corresponding to each second multimedia information are displayed in the second area in the form of the card. The second multimedia information is displayed to the right of the corresponding card, and the second key information is displayed above the corresponding card. FIG. 4 also illustrates the corresponding information source and the release time of each card.

Further, in order to enable the user to obtain more information, the information in each dimension about the target events that other users are interested in can be recommended to the user. In an embodiment, a search suggestion of a sub-event in each dimension under the target event can be displayed in a third area of the search result page, in case that the sub-event conforms to a preset attribute feature, a feature tag matching the preset attribute feature is displayed at a corresponding position of an event title of the sub-event.

The sub-event in each dimension can be the sub-event in each dimension related to the target event (such as the work dimension and emotion dimension of each target entity associated with the target event, and the interaction dimension among multiple target entities associated with the target event, etc.). The search suggestion can be determined based on the search information of each user. A third preset number of search suggestions can be displayed in the third area. The preset attribute feature may include popularity information and release time information. The popularity information can be determined according to the number of searches and/or comments. The feature tag that match the preset attribute feature may be a tag indicating high popularity, newly released, etc. For example, when a sub-event is an event with high popularity, a feature tag indicating high popularity can be displayed at the end of the event title of the sub-event.

The feature tag allows the user to quickly learn the attribute feature of each sub-event, so as to read selectively according to the attribute feature of the sub-event, thus improving the efficiency of information acquisition.

The third area can be located below the first area. In specific embodiments, the third area can also be located below the second area, and the second area is located below the first area, so that the user can continue to obtain information in various dimensions under the target events that other users are interested in after obtaining the core content of the target event and the second multimedia content related to the target entity.

Figure 5:
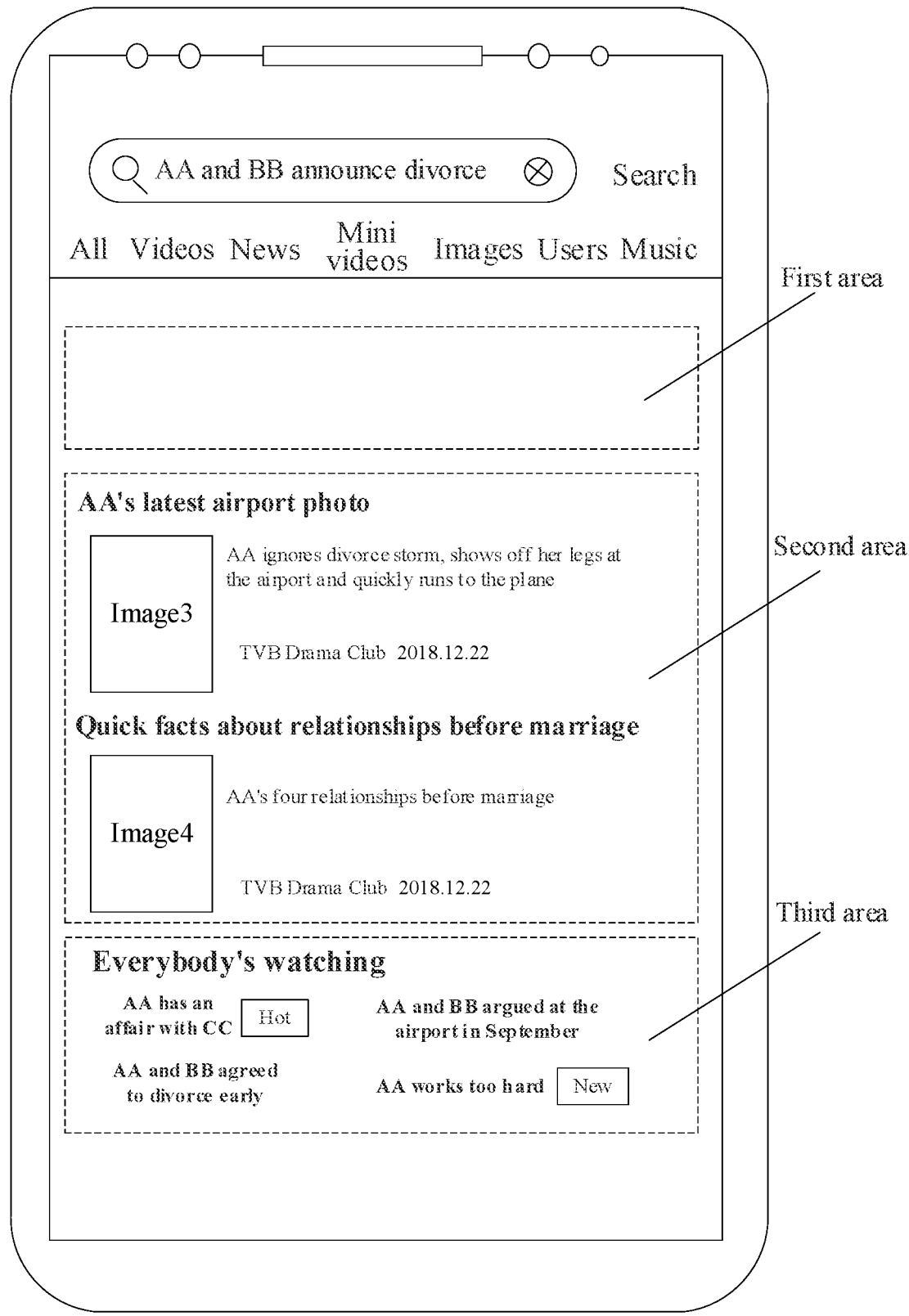
FIG. 5 is schematic diagram of a fourth search result page provided by an embodiment of the present disclosure.

As illustrated in FIG. 5, the third area is located below the second area, and the second area is located below the first area (it should be noted that the size of the first area in the figure does not represent the actual size, as the figure is only used to indicate the relative positions between the first, second, and third areas, and to simplify the content in the figure, the content in the first area is not depicted). The third area displays four search suggestions. The search suggestion "AA has an affair with CC" has high popularity, and it is accompanied by a "Hot" feature tag, and the search suggestion "AA works too hard" is recently released, and it is accompanied by a "New" feature tag.

Further, the comment content on the target event can also be displayed. In an embodiment, comment information for the target event is displayed in a fourth area of the search result page, and the comment information includes comment author information, comment content information and a source identifier of the comment information; and in response to a trigger operation for the comment information, original multimedia information where the comment information is located is displayed.

The fourth area can be arranged below the first area, the second area and the third area, so that after reading the content information related to the target event, the user can continue reading the comment information related to the target on the premise that the user is further interested.

The comment author information may include author identity information, an avatar, a name and other information, and the source identifier of the comment information may indicate the releasing platform information of the comment information. By displaying the comment author information, the comment content information and the source identifier of the comment information, the user can understand the comment information more comprehensively and read the comment information selectively.

By displaying the original multimedia information where the comment information is located in response to the trigger operation for the comment information, the user can better understand a comment object corresponding to the comment information, that is, the original multimedia information, thus meeting the users' need for detailed information.

Figure 6:
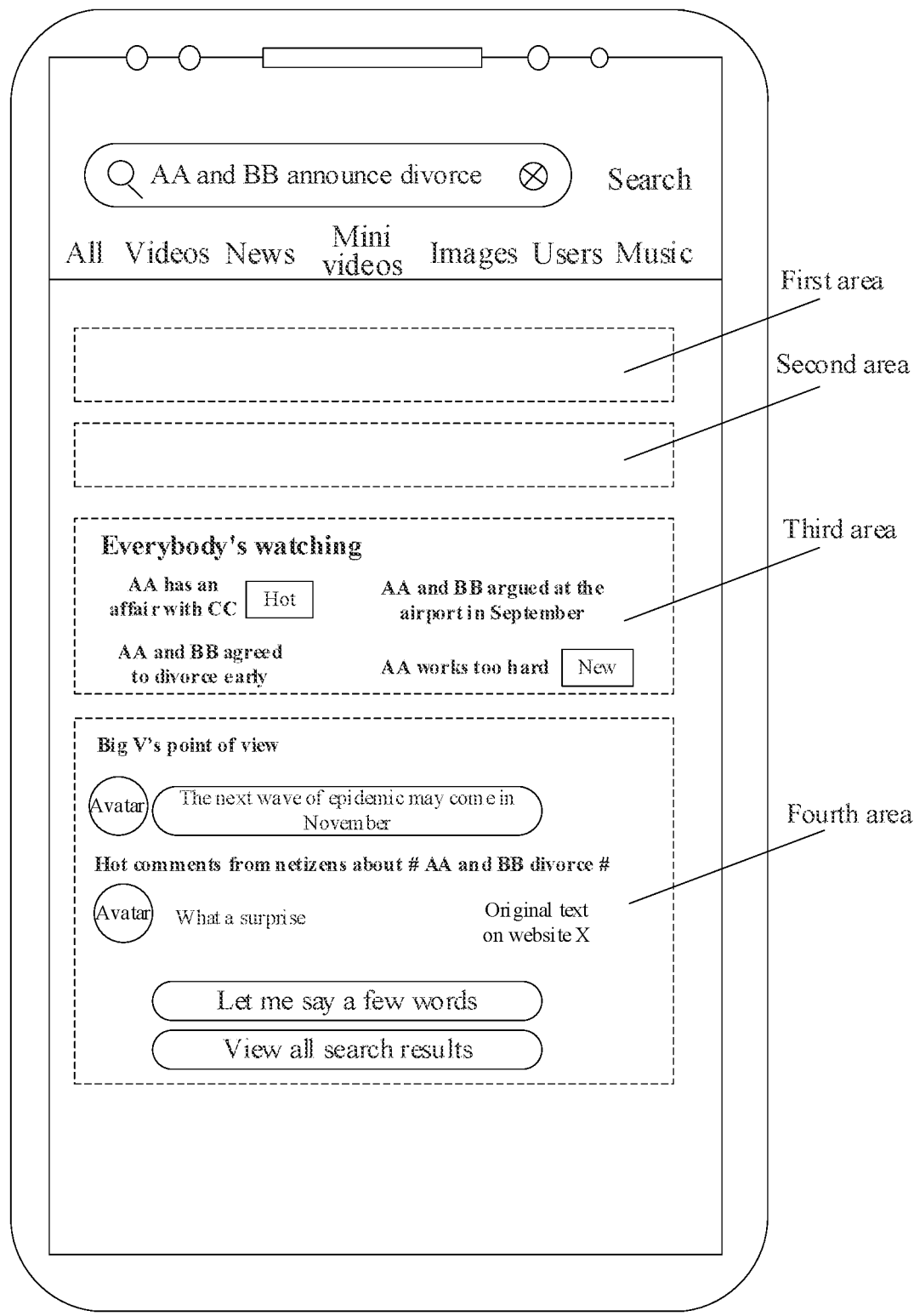
FIG. 6 is a schematic diagram of a fifth search result page provided by an embodiment of the present disclosure.

As illustrated in FIG. 6, the first area, the second area, the third area and the fourth area are sequentially arranged from top to bottom (it should be noted that the sizes of the first area and the second area in the figure do not represent the real area sizes, as the figure is only used to indicate the relative positions between the first, second, third and fourth areas, and to simplify the content in the figure, the content in the first area and the second area is not depicted). The figure illustrates the views of celebrities and the comments of users.

Interaction with the user can also be realized, and comment content for the original multimedia information can be displayed in the fourth area in response to a post operation for the comment content.

Further, recommendation information associated with the target event can be displayed according to the currently displayed target event. In an embodiment, a plurality of search recommendation information associated with the target event can be displayed in a fifth area of the search result page, the search recommendation information is an entity object related to the target event, and/or the search recommendation information is associated with an event type of the target event.

The fifth area can be arranged below the first area, the second area, the third area and the fourth area. After the user reads the content information and the comment information related to the target event, if there is a need to further explore more related information about the event, the user can continue to read a plurality of search recommendation information related to the target event.

The search recommendation information here can be determined according to the entity object related to the target event and/or the event type of the target event. The search recommendation information associated with the event type of the target event can be the same information as the event type of the target event. For example, if the target event is a relationship dispute event in the entertainment industry, then the search recommendation information can also be information related to the relationship dispute event in the entertainment industry.

Figure 7:
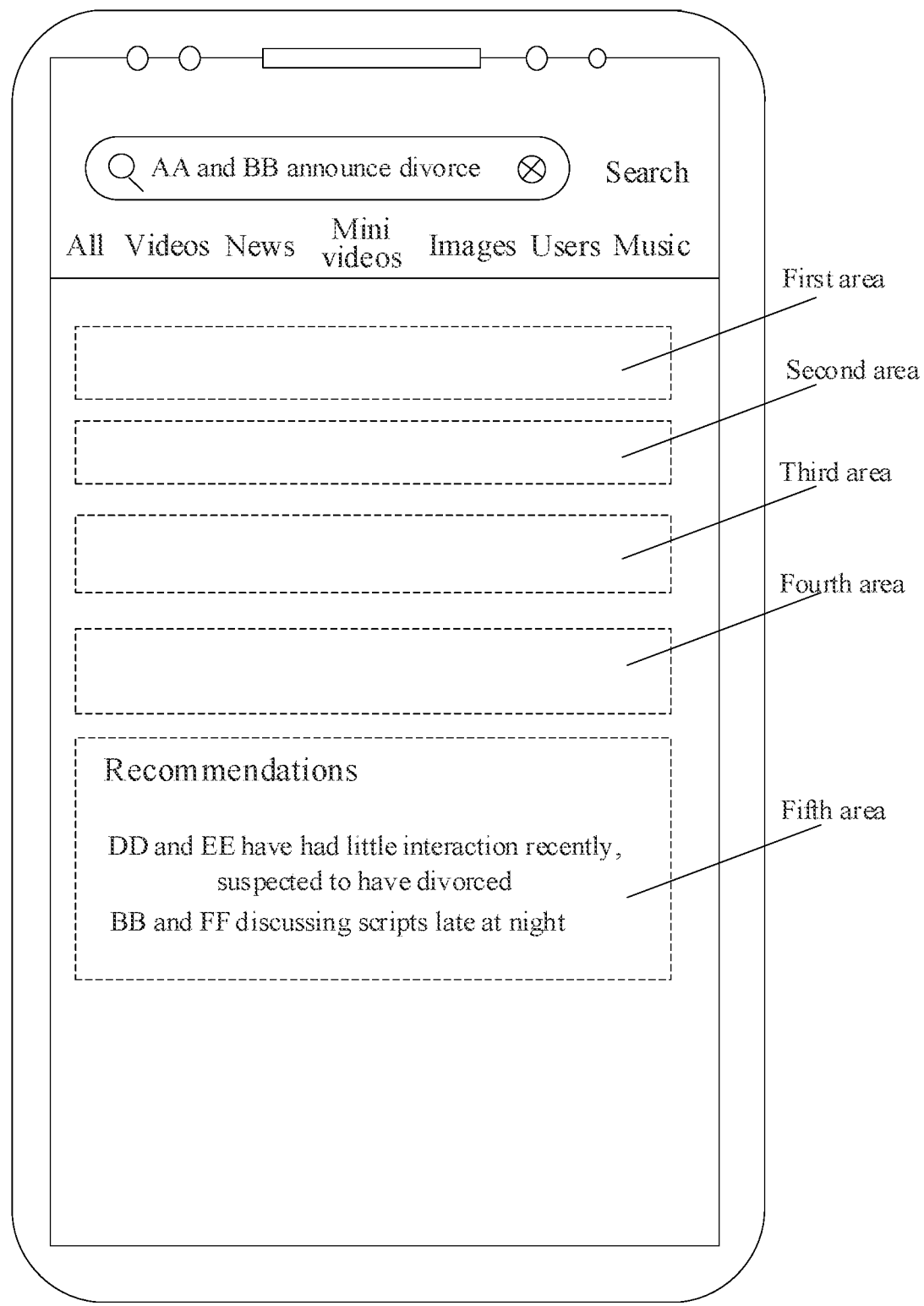
FIG. 7 is a schematic diagram of a sixth search result page provided by an embodiment of the present disclosure.

As illustrated in FIG. 7, the first area, the second area, the third area, the fourth area and the fifth area are sequentially arranged from top to bottom (it should be noted that the sizes of the first area, the second area, the third area and the fourth area in the figure do not represent the real area sizes, as the figure is only used to indicate the relative positions between the first, second, third, fourth and fifth areas, and to simplify the content in the figure, the content in the first area, the second area, the third area and the fourth area is not depicted). The fifth area in the figure displays the search recommendation information related to the entity object associated with the target event (such as "DD and EE have had little interaction recently, suspected to have divorced") and the search recommendation information associated with the event type of the target event (such as "BB and FF discussing scripts late at night").

To enable the user to quickly get the search recommendation information of interest, the feature tag can be determined according to the preset attribute feature of the event corresponding to the search recommendation information, and the feature tag is displayed at a corresponding position of the search recommendation information. The preset attribute feature here may also include popularity information and release time information. The feature tag of the search recommendation information can be displayed in the same way as the feature tag corresponding to the sub-event, and the specific display mode is not repeated here.

It can be understood by those skilled in the art that in the above-mentioned method according to specific embodiments, the order of writing the steps does not necessarily imply a strict execution sequence or impose any limitations on the embodiment process. The specific execution sequence of each step should be determined based on its functionality and possible inherent logic.

Based on the same inventive concept, an embodiment of the present disclosure also provides an information display apparatus corresponding to the information display method. Because the principle of solving problems by the apparatus in the embodiment of the present disclosure is similar to the above-mentioned information display method, the embodiment of the method can be used as a reference for the embodiment of the device, which will not be repeated here.

Figure 8:
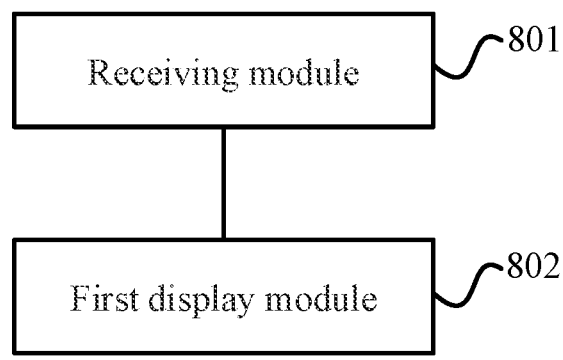
FIG. 8 is a schematic diagram of an information display apparatus provided by an embodiment of the present disclosure.

Referring to FIG. 8 which is a structural diagram of an information display apparatus provided by an embodiment of the present disclosure, the apparatus includes a receiving module 801 and a first display module 802.

The receiving module 801 is configured to receive search information; and the first display module 802 is configured to, in response to the existence of a target event matching the search information, display an event context of the target event in a first area of a search result page;

the event context includes a plurality of event nodes, a core content of each event node is presented through first multimedia information and first key information corresponding to the event node, the presentation form of the first key information is different from the presentation form of the first multimedia information, and the first key information is a summary of the first multimedia information.

In an optional embodiment, the first display module 802 is specifically configured to:

display the plurality of event nodes of the target event in the form of a timeline in the first area of the search result page, the time node on the timeline being in one-to-one correspondence with the event nodes, and at each time node of the timeline, first multimedia information for describing the progress of the target event at the time node and first key information corresponding to the first multimedia information being displayed; or, display first multimedia information corresponding to each event node and first key information corresponding to the first multimedia information in the form of a card in the first area of the search result page.

In an optional embodiment, the apparatus further includes:

a second display module configured to, in response to a trigger operation for the first key information, display a multimedia information aggregation page, the multimedia information aggregation page at least including text information and video information related to the first key information, where a target content matching the first key information is highlighted in the text information, the video information includes a feature identifier and video content, and the feature identifier is used for directly jumping to a time node corresponding to the first key information to play the video content after being triggered.

In an optional embodiment, the apparatus further includes:

a third display module configured to display second multimedia information released within a preset time period in the form of a card in a second area of the search result page, the second multimedia information being related to at least one target entity, and the target entity being an entity object related to the target event; and display second key information corresponding to the second multimedia information at an associated position of the second multimedia information, the second key information being a summary of the second multimedia information.

In an optional embodiment, the apparatus further includes:

a fourth display module configured to display a search suggestion of a sub-event in each dimension under the target event in a third area of the search result page, where in case that the sub-event conforms to a preset attribute feature, a feature tag matching the preset attribute feature is displayed at a corresponding position of an event title of the sub-event.

In an optional embodiment, the apparatus further includes:

a fifth display module configured to display comment information for the target event in a fourth area of the search result page, the comment information including comment author information, comment content information and a source identifier of the comment information; and in response to a trigger operation for the comment information, display original multimedia information where the comment information is located.

In an optional embodiment, the apparatus further includes:

a sixth display module configured to display a plurality of search recommendation information associated with the target event in a fifth area of the search result page, the search recommendation information being an entity object related to the target event, and/or the search recommendation information being associated with an event type of the target event.

For the process flow of each module in the apparatus and the interactive process between modules, please refer to the relevant description in the above method embodiment, which will not be repeated here.

Based on the same technical concept, an embodiment of the present disclosure also provides a computer device.

Figure 9:
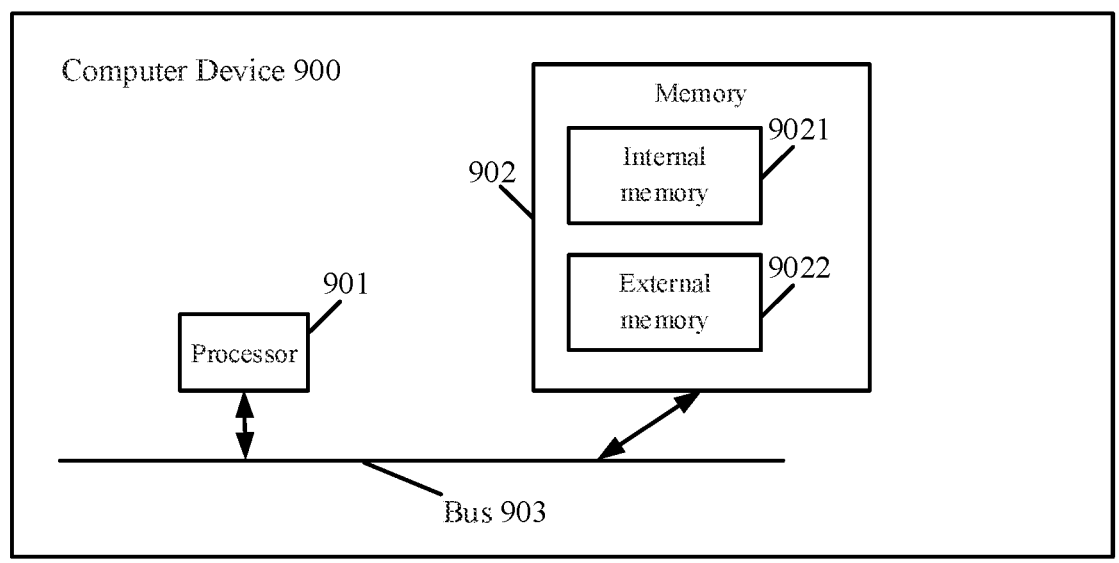
FIG. 9 is a schematic diagram of a computer device provided by an embodiment of the present disclosure.

Referring to FIG. 9 which a structural diagram of a computer device 900 provided by an embodiment of the present disclosure, the computer device includes a processor 901, a memory 902, and a bus 903. The memory 902 is used to store execution instructions, including an internal memory 9021 and the external memory 9022. Here, the internal memory 9021, also called internal storage, is used for temporarily storing operation data in the processor 901 and data exchanged with the external memory 9022 such as a hard disk. The processor 901 exchanges data with the external memory 9022 through the internal memory 9021. When the computer device 900 runs, the processor 901 communicates with the memory 902 through the bus 903, so that the processor 901 executes the following instructions:

receiving search information;

in response to the existence of a target event matching the search information, displaying an event context of the target event in a first area of a search result page;

the event context includes a plurality of event nodes, core content of each event node is presented through first multimedia information and first key information corresponding to the event node, the presentation form of the first key information is different from the presentation form of the first multimedia information, and the first key information is a summary of the first multimedia information.

An embodiment of the present disclosure also provides a computer-readable storage medium, on which a computer program is stored, and when the computer program is run by a processor, the steps of the information display method described in the above method embodiment are executed. The storage medium can be a volatile or nonvolatile computer-readable storage medium.

An embodiment of the present disclosure also provides a computer program product, which carries a program code, and the program code includes instructions that can be used to execute the steps of the information display method described in the above method embodiment. For details, please refer to the above-mentioned method embodiment, which is not repeated here.

The above computer program product can be implemented through hardware, software, or their combination. In one alternative embodiment, the computer program product is embodied as a computer storage medium, and in another alternative embodiment, the computer program product is embodied as a software product, such as a Software Development Kit (SDK).

It can be clearly understood by those skilled in the art that for the convenience and conciseness of description, to understand the specific working process of the system and apparatus described above, one can refer to the corresponding process in the aforementioned method embodiment, which will not be repeated here. In several embodiments provided by the present disclosure, it should be understood that the disclosed system, apparatus and method can be realized in other ways. The apparatus embodiment described above is only schematic. For example, the division of the units is only a logical function division, and there may be other division methods in actual embodiment. For another example, multiple units or components may be combined or integrated into another system, or some features may be ignored or not implemented. Furthermore, the displayed or discussed coupling or direct coupling or communication can be indirect coupling or communication through some communication interfaces, apparatuses, or units, which can be electrical, mechanical, or in other forms.

The units described as separate components may or may not be physically separated, and the components displayed as units may or may not be physical units, i.e., may be located in one place or may be distributed over plurality of network units. Some or all of the units can be selected according to actual needs to achieve the purpose of this embodiment.

In addition, all functional units in each embodiment of the present disclosure may be integrated into one processing unit, or exist physically separated, or two or more units may be integrated into one unit.

If the functions are realized in the form of software functional units and sold or used as independent products, they can be stored in a processor-executable nonvolatile computer-readable storage medium. Based on this understanding, the essence of the technical solution of the present disclosure, or the part that contributes to the prior art, or part of this technical solution, can be embodied in the form of a software product, which is stored in a storage medium and includes several instructions to make a computer device (which can be a personal computer, a server, a network device, etc.) execute all or part of the steps of the method described in various embodiments of the present disclosure. The aforementioned storage media include: USB flash disk, mobile hard disk, read-only memory (ROM), random access memory (RAM), magnetic disk or optical disk and other media that can store program codes.

Finally, it should be noted that the above-mentioned embodiments are only specific embodiments of present disclosure, which are used to illustrate the technical solution of the present disclosure, but not to limit it. The protection scope of the present disclosure is not limited to these embodiments. Although the present disclosure has been described in detail with reference to the above-mentioned embodiments, it should be understood by those of ordinary skill in the art that any technician familiar with the technical field can still modify or easily think of changes to the technical solution recorded in the above-mentioned embodiments within the technical scope of the present disclosure, or equivalently replace certain technical features described in the aforementioned embodiments. These modifications, changes or substitutions do not make the essence of the corresponding technical solution deviate from the spirit and scope of the technical solution of the embodiments of the present disclosure, and should be included in the protection scope of the present disclosure. Therefore, the scope of protection of the present disclosure should be based on the scope of protection of the claims.

The invention claimed is:

1. An information display method, comprising:
receiving search information; and
in response to an existence of a target event matching the search information, displaying an event context of the target event in a first area of a search result page,
wherein the event context comprises at least one event node, a core content of each event node is presented through first multimedia information and first key information corresponding to the event node;
wherein displaying the event context of the target event in the first area of the search result page comprises:
for each event node of the at least one event node:
acquiring the first multimedia information corresponding to the event node and displaying the first multimedia information corresponding to the event node in a first presentation form,
extracting key information from the first multimedia information corresponding to the event node to generate the first key information corresponding to the event node in a summarized way, and displaying the first key information corresponding to the event node in a second presentation form; and
wherein the first presentation form is different from the second presentation form;
wherein the method further comprises:
displaying comment information for the target event in a fourth area of the search result page, the comment information comprising comment author information, comment content information and a source identifier of the comment information, wherein the source identifier of the comment information indicates information of a releasing platform of the comment information; and
in response to a trigger operation for the comment information, displaying original multimedia information where the comment information is located.

2. The method according to claim 1, wherein displaying the event context of the target event in the first area of the search result page further comprises:
displaying the at least one event node of the target event in a form of a timeline in the first area of the search result page, a time node on the timeline being in one-to-one correspondence with the at least one event node, wherein at each time node of the timeline, first multimedia information for describing a progress of the target event at the time node and first key information corresponding to the first multimedia information for describing the progress of the target event at the time node are displayed; or,
displaying first multimedia information corresponding to each event node and first key information corresponding to the first multimedia information in a form of a card in the first area of the search result page.

3. The method according to claim 1, further comprising:
in response to a trigger operation for the first key information, displaying a multimedia information aggregation page, the multimedia information aggregation page at least comprising text information and video information related to the first key information, wherein a target content matching the first key information is highlighted in the text information, the video information comprises a feature identifier and a video content, and the feature identifier is used for directly jumping to a time node corresponding to the first key information to play the video content after being triggered.

4. The method according to claim 1, further comprising:
displaying second multimedia information released within a preset time period in a form of a card in a second area of the search result page, the second multimedia information being related to at least one target entity, and the target entity being an entity object related to the target event; and
displaying second key information corresponding to the second multimedia information at an associated position of the second multimedia information, the second key information being a summary of the second multimedia information.

5. The method according to claim 1, further comprising:
displaying a search suggestion of a sub-event in each dimension under the target event in a third area of the search result page, wherein in case that the sub-event conforms to a preset attribute feature, a feature tag matching the preset attribute feature is displayed at a corresponding position of an event title of the sub-event.

6. The method according to claim 1, further comprising:
displaying a plurality of search recommendation information associated with the target event in a fifth area of the search result page, wherein the plurality of search recommendation information is an entity object related to the target event, and/or the plurality of search recommendation information is associated with an event type of the target event.

7. An information display apparatus, comprising:
a receiving module configured to receive search information; and
a first display module configured to, in response to an existence of a target event matching the search information, display an event context of the target event in a first area of a search result page,
wherein the event context comprises at least one event node, a core content of each event node is presented through first multimedia information and first key information corresponding to the event node;
wherein to display the event context of the target event in the first area of the search result page, the first display module is configured to:
for each event node of the at least one event node:
acquire the first multimedia information corresponding to the event node and display the first multimedia information corresponding to the event node in a first presentation form,
extract key information from the first multimedia information corresponding to the event node to generate the first key information corresponding to the event node in a summarized way, and display the first key information corresponding to the event node in a second presentation form;
wherein the first presentation form is different from the second presentation form;
wherein the apparatus further comprises:
a fifth display module, configured to display comment information for the target event in a fourth area of the search result page, the comment information comprising comment author information, comment content information and a source identifier of the comment information, wherein the source identifier of the comment information indicates information of a releasing platform of the comment information; and in response to a trigger operation for the comment information, display original multimedia information where the comment information is located.

8. A computer device, comprising a processor, a memory and a bus, wherein the memory stores machine-readable instructions executable by the processor; the processor communicates with the memory through the bus upon the computer device running; and the machine-readable instructions upon being executed by the processor, an information display method is implemented, and the method comprises:
receiving search information; and
in response to an existence of a target event matching the search information, displaying an event context of the target event in a first area of a search result page,
wherein the event context comprises at least one event node, a core content of each event node is presented through first multimedia information and first key information corresponding to the event node;
wherein displaying the event context of the target event in the first area of the search result page comprises:
for each event node of the at least one event node:
acquiring the first multimedia information corresponding to the event node and displaying the first multimedia information corresponding to the event node in a first presentation form,
extracting key information from the first multimedia information corresponding to the event node to generate the first key information corresponding to the event node in a summarized way, and displaying the first key information corresponding to the event node in a second presentation form;
wherein the first presentation form is different from the second presentation form;
wherein the method further comprises:
displaying comment information for the target event in a fourth area of the search result page, the comment information comprising comment author information, comment content information and a source identifier of the comment information, wherein the source identifier of the comment information indicates information of a releasing platform of the comment information; and
in response to a trigger operation for the comment information, displaying original multimedia information where the comment information is located.

9. A computer-readable storage medium, wherein a computer program is stored on the computer-readable storage medium, and upon the computer program being executed by a processor, the information display method according to claim 1 is implemented.

10. The apparatus according to claim 7, wherein the first display module is further configured to:
display the at least one event node of the target event in a form of a timeline in the first area of the search result page, a time node on the timeline being in one-to-one correspondence with the at least one event node, wherein at each time node of the timeline, first multimedia information for describing a progress of the target event at the time node and first key information corresponding to the first multimedia information for describing the progress of the target event at the time node are displayed; or,
display first multimedia information corresponding to each event node and first key information corresponding to the first multimedia information in a form of a card in the first area of the search result page.

11. The apparatus according to claim 7, further comprising:
a second display module configured to, in response to a trigger operation for the first key information, display a multimedia information aggregation page, the multimedia information aggregation page at least comprising text information and video information related to the first key information, wherein a target content matching the first key information is highlighted in the text information, the video information comprises a feature identifier and a video content, and the feature identifier is used for directly jumping to a time node corresponding to the first key information to play the video content after being triggered.

12. The apparatus according to claim 7, further comprising:
a third display module configured to display second multimedia information released within a preset time period in a form of a card in a second area of the search result page, the second multimedia information being related to at least one target entity, and the at least one target entity being an entity object related to the target event; and
display second key information corresponding to the second multimedia information at an associated position of the second multimedia information, the second key information being a summary of the second multimedia information.

13. The apparatus according to claim 7, further comprising:
a fourth display module configured to display a search suggestion of a sub-event in each dimension under the target event in a third area of the search result page, wherein in case that the sub-event conforms to a preset attribute feature, a feature tag matching the preset attribute feature is displayed at a corresponding position of an event title of the sub-event.

14. The apparatus according to claim 7, further comprising:
a sixth display module configured to display a plurality of search recommendation information associated with the target event in a fifth area of the search result page, wherein the plurality of search recommendation information is an entity object related to the target event, and/or the plurality of search recommendation information is associated with an event type of the target event.

15. The computer device according to claim 8, wherein displaying the event context of the target event in the first area of the search result page further comprises:
displaying the at least one event node of the target event in a form of a timeline in the first area of the search result page, a time node on the timeline being in one-to-one correspondence with the at least one event node, wherein at each time node of the timeline, first multimedia information for describing a progress of the target event at the time node and first key information corresponding to the first multimedia information for describing the progress of the target event at the time node are displayed; or,
displaying first multimedia information corresponding to each event node and first key information corresponding to the first multimedia information in a form of a card in the first area of the search result page.

16. The computer device according to claim 8, wherein the method further comprises:
in response to a trigger operation for the first key information, displaying a multimedia information aggregation page, the multimedia information aggregation page at least comprising text information and video information related to the first key information, wherein a target content matching the first key information is highlighted in the text information, the video information comprises a feature identifier and a video content, and the feature identifier is used for directly jumping to a time node corresponding to the first key information to play the video content after being triggered.

17. The computer device according to claim 8, wherein the method further comprises:
displaying second multimedia information released within a preset time period in a form of a card in a second area of the search result page, the second multimedia information being related to at least one target entity, and the at least one target entity being an entity object related to the target event; and
displaying second key information corresponding to the second multimedia information at an associated position of the second multimedia information, the second key information being a summary of the second multimedia information.

* * * * *